Oct. 20, 1959

D. B. HORTON 2,909,191

ANHYDROUS AMMONIA METERING DEVICE

Filed Dec. 27, 1955

INVENTOR
DONELSON B. HORTON

BY Cushman, Darby & Cushman
ATTORNEYS

Oct. 20, 1959   D. B. HORTON   2,909,191
ANHYDROUS AMMONIA METERING DEVICE
Filed Dec. 27, 1955   2 Sheets-Sheet 2

INVENTOR
DONELSON B. HORTON

2,909,191

ANHYDROUS AMMONIA METERING DEVICE

Donelson B. Horton, Huntsville, Ala., assignor to John Blue Company, Inc., Huntsville, Ala., a corporation of Alabama Application December 27, 1955, Serial No. 555,482

9 Claims. (Cl. 137—501)

The present invention relates to apparatus for distributing liquids, and, more particularly, relates to a metering device for distributing anhydrous ammonia and other similar liquids useful in agriculture from a vehicle to the soil at a constant rate of application per unit area. The metering device of the present invention not only meters the flow of liquid at a constant rate from a source of liquid under a pressure which can vary, but also compensates for back pressure changes which would affect the rate of flow and changes in the speed of travel of the vehicle from which the liquid is being distributed.

The large scale application of liquid fertilizers, weed killers and insecticides has been accomplished in the past by flowing the liquid from fluid supply tanks to fluid applicators, for example, curved plows having a tubular member welded on the rear side through which the liquid may be injected into the soil. The plows serve the dual purpose of carrying the liquid tubes while at the same time furrowing the soil to receive the liquid at a depth of from four to eight inches, the furrows being promptly filled in order to prevent the escape of liquid.

A prior apparatus for metering liquid to the soil in accordance with the rate of travel of the vehicle carrying the apparatus is disclosed in United States Patent No. 2,696,785, issued December 14, 1954, to John Blue. In the aforementioned patent, a metering pump, positioned in the liquid lines between the distributing means and the liquid supply, was geared directly to the vehicle so that the pump would distribute the liquid at a rate of flow varying with the speed of the vehicle. The present invention contemplates using a metering device of flow varying with the speed of the vehicle. The aforementioned patent and utilization of the pressure of liquid in the liquid supply tank to cause flow of liquid. The details of the description of the applicable structure such as the vehicle, the liquid supply tank, and the liquid distributing means in the above mentioned patent are not repeated herein, it being understood that the patent referred to discloses well known equipment which would be used with the present invention, and to that extent forms a part of the present disclosure.

In the past, prior apparatus, depending on the pressure of the liquid in the supply tank for flow of the liquid, employed flow regulators and flow meters to distribute a quantity of liquid. However, such flow regulators and flow meters were not adjustable to proportion the liquid distribution in accordance with the rate of travel of the vehicle nor did they evenly distribute the liquid because of field conditions which would change back pressures in the liquid conduits leading to the distributing means and, thus, give inaccurate metering.

Accordingly, it is an object of the present invention to provide an apparatus for applying liquid anhydrous ammonia and other liquids to the soil, in which the disadvantages described above are overcome.

Another object of the present invention is to provide a flow regulator for use in apparatus to distribute liquid to the soil from a moving vehicle, the flow regulator being adjustable by the operator of the vehicle to set it for a particular rate of application for a unit of area.

Still another object of the present invention is to provide a metering device which will automatically compensate for back pressure fluctuations in the conduit leading to the distributing means from the metering means, the compensation being such that the metering means is not affected and the quantity of the liquid being distributed is not varied.

Still a further object of the present invention is to provide a flow regulator for use in a system for metering a liquefied gas, such as anhydrous ammonia, the metering of the liquid remaining substantially constant regardless of fluctuations in the pressure of the liquefied gas.

A further object of the present invention is to provide a system for metering anhydrous ammonia or like fluids to the soil from a moving vehicle, the rate of flow of liquid at a constant rate of application per unit area being adjustable by the operator of the vehicle while the vehicle is moving to take into account the speed of travel of the vehicle.

These and other objects of the invention will appear more fully in the following specification, claims and drawings in which:

Figure 5:
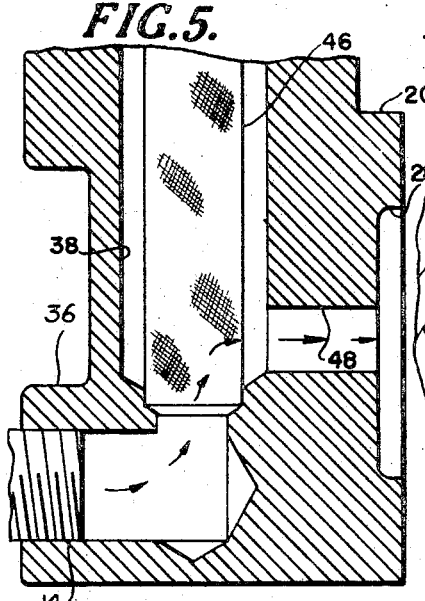
Figure 5 is a fragmentary sectional view taken on the line 5—5 of Figure 2.

Referring now to the drawings, the metering device of the present invention is generally indicated by the numeral 10 and is carried in a convenient location such as a dashboard or instrument panel 12 of a suitable vehicle. Only a portion of the dashboard 12 is shown in the drawings, it being understood that the metering device 10 is mounted in a position convenient to the driver whereby the driver can easily adjust the same while the tractor is in motion. Metering device 10, which is a flow regulator of the type utilizing a differential pressure to meter the liquid, is provided with an inlet conduit 14 connected to a suitable source of supply such as a tank of liquefied anhydrous ammonia, and an outlet conduit 16 which is connected to a suitable distributing means such as a plow having a liquid discharge tube connected thereto. A suitable shut-off valve (not shown) may be provided in conduit 16 and, when the shut-off valve is opened, the liquid under pressure in the supply tank will flow through metering device 10 where it is metered, as will be described later in the specification and then through outlet conduit 16 to the distributing means.

Figure 3:
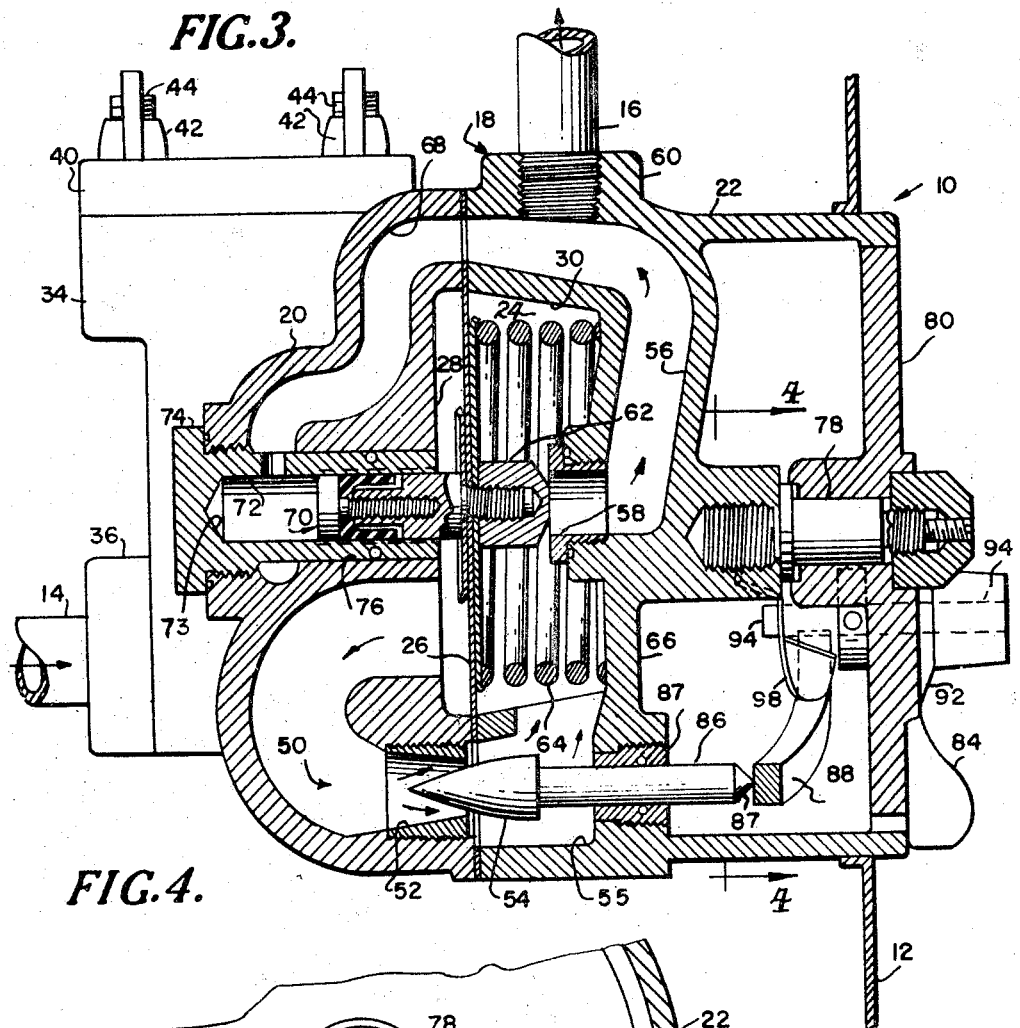
Figure 3 is a vertical sectional view taken on the line 3—3 of Figure 1.

Metering device 10 includes a casing 18 formed of two sections 20 and 22, the sections 20 and 22 when positioned together defining a chamber 24 therein. A flexible diaphragm 26 is supported between sections 20 and 22 of casing 18 and divides chamber 24 into an inlet chamber 28 and an outlet chamber 30. As best shown in Figure 3, suitable bolts 32 circumferentially spaced about the perimeter of the casing and passing through its two sections 20 and 22 hold the sections together as well as holding the diaphragm 26 in place.

Section 20 of casing 18 is provided with a housing 34 integral therewith, the housing having a threaded boss 36 for receiving the threaded end of inlet conduit 14. A vertical bore 38, reduced at its lower end, communicates with the bore of boss 36. A cover plate 40, provided on the top of housing 34 is held in position by wing nuts 42 received on studs 44 extending upwardly from the housing. Cover 40 closes the upper end of bore 38. A suitable filter element such as a tubular screen 46 is provided in bore 38, the screen 46 being adapted to remove any solid material which may be present in the liquid flowing from the supply tank to the metering device. As best shown in Figure 5, section 20 is provided with a passageway 48 which places the bore 38 in communication with the inlet chamber 28. Thus, it can be seen that the flow of liquid into the inlet chamber will be in the direction of the arrows shown in Figure 5, that is, from the conduit 14 upwardly into the interior of screen 46 and then through screen and passageway 48 into inlet chamber 28.

Referring now to Figure 3, it will be noted that section 20 of casing 18 is provided with a passageway 50 opening into inlet chamber 28 and terminating in a restricted orifice 52. Restricted orifice 52 is positioned between inlet chamber 28 and outlet chamber 30 and provides a pressure differential between the liquid in the inlet chamber and the liquid in the outlet chamber when liquid is flowing through the metering device. A valve element 54 is adapted to reciprocate into and out of orifice 52 to thereby change the size of the orifice and, thus, the flow therethrough, as will be described in more detail later in the specification.

A passageway 55 in section 22 of casing 18 provides a path of communication between orifice 52 and the outlet chamber 30. Section 22 of casing 18 is provided with a second passageway 56 which opens into the center of outlet chamber 30 at 58. The other end of passageway 56 communicates with conduit 16 through a threaded boss 60 provided on section 22. As is now evident, liquid flowing from the supply tank will enter inlet chamber 28 through passageway 48 (Figure 5) and will then flow out of chamber 28 through passageway 50 and orifice 52 into outlet chamber 30 and out of chamber 30 through passageway 56 to the outlet conduit 16 (Figure 3) and distributor means. Under ideal conditions where there is no variation of pressure in the fluid from the supply tank, the pressure differential between chambers 28 and 30 will remain constant and the rate of flow of liquid out of the conduit 16 will be uniform. In other words, under such conditions no diaphragm would be needed; however, such is not the case in the metering of a liquefied gas such as anhydrous ammonia in that the liquid pressures on the inlet side of the diaphragm will vary considerably as the pressures in the supply tank vary.

In order that a constant rate of flow as determined by a constant pressure differential may be maintained, a pressure regulating valve 62 is attached to diaphragm 26 and is adapted to cooperate with the opening 58 in passage 56, the valve varying the opening dependent upon pressure conditions in the inlet chamber. Further, it will be noted that a spring 64 between the diaphragm and end wall 66 of section 22 normally urges the diaphragm and the valve toward an open position. Under constant pressure conditions in the inlet chamber 28, valve 62 will remain open a predetermined distance and the pressure differential between chambers 28 and 30 will remain constant. However, an increase in pressure in chamber 28 causes the diaphragm to move toward the right (Figure 3), and valve 62 moves toward its closed position, thereby reducing the size of opening 58. Pressure will build up in chamber 30 a corresponding amount so that the pressure differential across the orifice 52 will remain constant and consequently the quantity of liquid flowing out of the outlet conduit will remain uniform. Conversely, if the pressure in chamber 28 is reduced, diaphragm 26 will move toward the left and valve 62 will open further, thereby allowing more flow from the outlet chamber 30 into the passageway 56 causing a drop in pressure in the chamber and, thus, still maintaining the pressure differential across the orifice constant.

Since the distributing means (not shown) passes through the soil, various field conditions will cause back pressure changes or fluctuations in the outlet conduit 16. Such back pressure changes are reflected throughout the length of the conduit 16 and, as will be evident from Figure 3, the back pressure changes will act on the outlet side of the diaphragm 26 on an area equal to the opening 58. If the back pressure in conduit 16 were constant it would have no effect on the pressure differential, but since it may vary under field conditions from about 10 to 100 pounds per square inch, such a variance will materially affect the uniform metering of liquid as it will affect the pressure differential across the metering orifice 52.

In order to eliminate the effect due to a varying back pressure, the metering device 10 is provided with a cored passageway 68 which extends from passageway 56 to the inlet side of the diaphragm. More particularly, it will be noted that diaphragm 26 is provided with a piston member 70 which is adapted to reciprocate in a bore 72 of a cylinder member 74 which is connected to the inlet side of diaphragm 26. Section 20 of casing 18 is provided with an axial bore 76 opening into chamber 28, the bore 76 being adapted to receive the cylinder member 74. Bore 72 in cylinder member 74 is closed at its outer end as indicated at 73 and opens to chamber 28 as well as to the passageway 68. Piston member 70 reciprocates in bore 72 when diaphragm 26 moves to the right or left. However, if there is a fluctuation of back pressure in conduit 16, the change will not only be reflected on the discharge side of the diaphragm but because of the piston and passageway arrangement just previously described, the pressure will also be reflected on the inlet side of the diaphragm and thus there will be a counterbalancing of back pressure. It will be noted that the area of the piston 70 is substantially equal to the effective area of the discharge opening 58 from chamber 30 so that there can be a perfect balancing of back pressure.

As heretofore mentioned, the size of restricted orifice 52 may be varied by moving the valve element 54 into and out of the orifice. When it is desired to change the application rate of the liquid distributed from the distributing means, it is merely necessary to move valve element 54 into or out of orifice 52, thus causing a change in the rate of flow therethrough. It will be noted that the metering valve 54 is so constructed as to give a straight line variation in area with, of course, a resultant straight line variation in the flow rate. In other words, the same increment of movement of the valve element 54 at any point of its travel will give the same increase or decrease in the flow rate through the metering device.

Since the metering device is adapted for use with a moving vehicle, and, as previously mentioned, since it is not geared directly to the speed of the tractor as in the case of the pump in the aforementioned Blue patent, the largest error which occurs in metering liquid by such a flow pressure regulator occurs due to the change of forward speed of the tractor by the operator. In other words, prior flow pressure regulators included no convenient means by which the operator of the vehicle could readily compensate for changes of speed of the vehicle moving across a unit area, and, consequently, the operator was inclined to leave the metering devices set for a particular rate of flow.

In the present invention, means are provided for not only setting the metering device to a predetermined rate of application, but in addition, means are provided for correcting the setting of the metering device for a particular rate of application in accordance with the speed with which the vehicle is being operated.

In more detail, section 22 of casing 18 is provided with a pin or hub 78 on which is mounted for rotation with respect thereto a dial 80. Dial 80 has suitable indicia thereon indicating miles per hour corresponding to the rate of travel of the tractor and the casing 18 has an indicator arrow 82 with which the desired speeds may be aligned. A suitable handle or lug 84 is provided on the dial so that it may easily be changed by the operator of the tractor.

Figure 4:
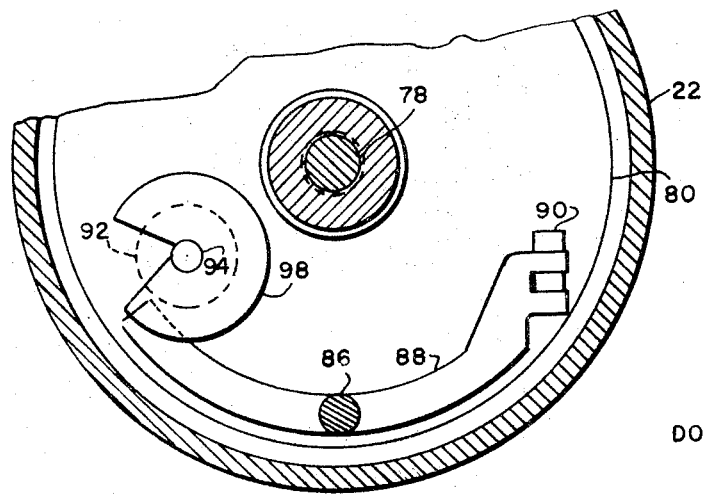
Figure 4 is a fragmentary sectional view taken on the line 4—4 of Figure 3.

Metering valve 54 is provided with a valve actuating stem 86 extending through a suitable bearing 87 in the rear wall 66 of section 22. As best shown in Figure 4, an arcuate-shaped valve actuating arm 88 hingedly connected at 90 to dial 80 for pivoting on an axis perpendicular to the axis of movement of metering valve 54 engages an end 87 (Figure 3) of the valve stem 86 to move metering valve 54 into orifice 52. The pressure of liquid travelling through orifice 52 will cause valve 54 to normally be urged in a direction of engagement with the valve actuating arm 88.

Figure 1:
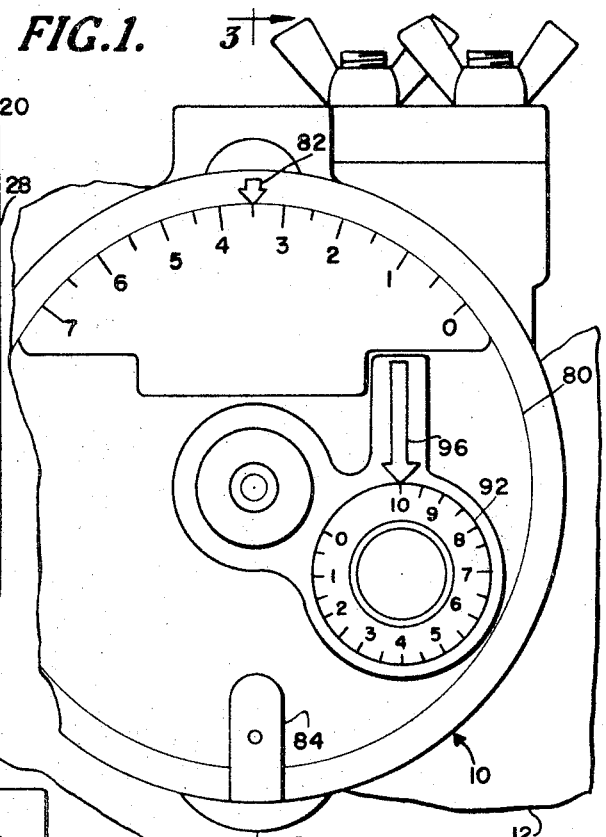
Figure 1 is a fragmentary front elevational view of the metering device of the present invention mounted on the instrument panel of a vehicle.
Figure 2:
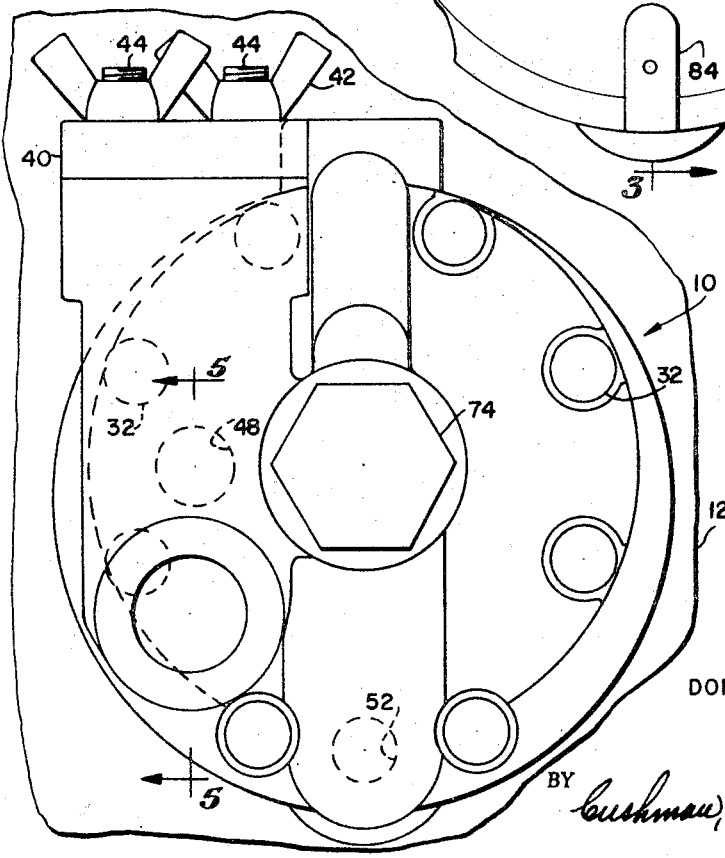
Figure 2 is a rear elevational view of the metering device disclosed in Figure 1.

A dial 92 is rotatably mounted on dial 80 by means of a pin 94. Dial 92 has indicia thereon designating various rates of application. As shown in Figure 1, an indicator arrow 96 on dial 80 is adapted to be aligned with the indicia on dial 92 for a particular rate of application. As best shown in Figures 3 and 4, the pin 94 which rotatably supports dial 92 is provided with a helical element 98 which is adapted to engage the valve stem actuating arm 88. Rotation of dial 92 will cause helical member 98 to rotate and it will move the valve stem actuating arm about its hinge point 90 in an arc, the plane of which is parallel to the axis of valve actuating stem 86 and, thus, will move the metering valve into and out of the restricted orifice 52.

To operate the metering device of the present invention for regulating the rate of application of liquid from the distributing means, dial 92 is first set to a particular desired rate of application per unit area. In other words, it is rotated until the desired number is aligned with the arrow 96, the number representing a quantity of liquid required for a particular application of a unit area. As the tractor is moving over the area at a particular rate of speed, the operator then moves the larger dial 80 to the corresponding miles per hour. The movement of the speed dial 80 will correct the size of the orifice 52 to the amount set by the rate of application dial 92.

It will be obvious from the above description that the present invention provides an extremely versatile, inexpensive and practical metering device of the flow regulator type for distributing liquid anhydrous ammonia and similar liquids without the disadvantages previously encountered in such devices. In other words, the present invention provides an accurate means of metering the liquid, taking into account and compensating for variations in back pressures developed in the system due to field conditions. In addition, the flow regulator incorporates means to accurately set the device for applying a specified quantity of liquid to a unit area, and means for correcting or adjusting the quantity setting to the rate of speed with which the distributor means is moved across the unit of area.

It also will be realized that although the metering device has been illustrated and described as being provided with an adjustable metering orifice for varying the rate of flow through the device, the device may be provided with a fixed metering orifice with a consequent elimination of the valve element 54, and an appropriate linkage or mechanism connected between the arm 88 and the spring 64 in order to adjust the force of the latter by adjustment of the dials 80 and 92. By means of such a construction, which is not illustrated in detail, the rate of flow through the metering device would be varied by varying the pressure differential across the metering orifice 52 instead of by varying the area of such metering orifice.

The terminology used in the specification is for the purpose of description and not limitation, the scope of the invention being defined in the claims.

I claim:

1. A flow regulator for metering a fluid from a pressure source thereof to a travelling distributor for application at a lower pressure to the soil, comprising: a casing having an inlet chamber and an outlet chamber provided with an inlet and an outlet, respectively; a diaphragm forming a wall common to said chambers and responsive to pressure differentials therebetween; a restricted orifice providing communication, and for causing a pressure differential between said chambers; a metering valve movable into and out of said orifice for varying the area thereof in order to vary the rate of flow therethrough, said valve being constructed to give a straight line variation in rate of flow of fluid through said orifice for equal increments of movement of said valve; means for moving said metering valve with respect to said orifice to thereby set the regulator for a predetermined volumetric rate of flow of fluid; means for correcting the setting of said last-mentioned means according to the rate of travel of the distributor a pressure regulating valve adapted to provide a variable opening between said outlet chamber and said outlet, pressure in said outlet being effective to develop an opening force on said regulating valve; a connection between said regulating valve and said diaphragm for operating said valve to decrease or increase said opening when there is an increase or decrease, respectively, of said pressure differential to thereby maintain the latter substantially constant pressure responsive means connected to said diaphragm for counterbalancing the opening force on said valve developed by pressure in said outlet; and means for communicating said outlet pressure to said pressure responsive means.

2. A flow regulator for regulating the rate of application of fluid to the soil from a pressure source by a moving distributor, comprising: a casing having an inlet chamber and an outlet chamber; orifice means providing communication, and for causing a pressure differential, between said chambers; pressure regulating means responsive to changes in said pressure differential for maintaining the latter substantially constant; means for adjusting one of said means to adjust the rate of flow through the regulator; first setting means having indicia associated therewith to indicate rates of application in quantities per unit area and operable to adjust said adjustable means to set the device for a predetermined rate of application for a given rate of travel of the distributor; and second setting means having indicia associated therewith to indicate rates of travel of the distributor and operable to further adjust said adjustable means to correlate the setting of said first setting means with different rates of travel of the distributor so that at a different rate of travel actual application will take place at the rate of application set by said first setting means.

3. The structure defined in claim 2 wherein the first and second setting means are operable independently of each other to adjust the adjustable means.

4. The structure defined in claim 2 wherein both setting means are operable to adjust the orifice means.

5. A flow regulator for regulating the rate of application to the soil of fluid by a moving distributor from a pressure source, comprising: a casing having an inlet chamber and an outlet chamber; a diaphragm forming a wall common to said chambers and responsive to pressure differentials therebetween; a restricted orifice between said chambers for causing a pressure differential therebetween; means responsive to movement of said diaphragm for maintaining said pressure differential substantially constant; a metering valve movable into and out of said orifice to vary the size thereof, said valve including a valve operating stem reciprocally mounted in said casing; a first valve-adjusting dial rotatably mounted on said casing; a valve-stem-actuating arm hingedly connected to said dial and engaged with said stem; a second valve-adjusting dial rotatably mounted on said first dial and having means to engage and move said arm relative to said first dial, one of said dials having indicia associated therewith to indicate rates of application in quantities per unit area and being adapted to adjust said valve to set the device for a predetermined rate of application for a given rate of travel, and the other of said dials having indicia associated therewith to indicate rates of travel of the distributor and being adapted to further adjust said valve to correlate the setting of said one dial with different rates of travel of the distributor so that at a different rate of travel actual application will take place at the rate of application set by said one dial.

6. A device of the character described in claim 5 wherein the means on said second dial to engage and move said valve stem actuating arm is a helical element rotatable by said second dial.

7. A flow regulator for regulating the rate of application of fluid to the soil from a pressure source by a moving distributor, comprising: a casing having an inlet chamber and an outlet chamber; orifice means providing communication, and for causing a pressure differential, between said chambers; pressure regulating means responsive to changes in said pressure differential for maintaining the latter substantially constant; means for adjusting the effective size of said orifice means to adjust the rate of flow through the regulator; a first dial having indicia associated therewith to indicate rates of application in quantities per unit area and operably connected to said adjusting means to set the regulator for a predetermined rate of application at a given rate of travel; and a second dial having indicia associated therewith to indicate rates of travel and operably connected to said adjusting means to further set the regulator to correlate the setting of said first dial with different rates of travel.

8. A flow regulator for regulating the rate of application of fluid to the soil from a pressure source by a travelling distributor, comprising: a casing having an inlet part and a separate outlet part clamped together with a pressure-responsive diaphragm therebetween which defines, together with said inlet and outlet parts, inlet and outlet chambers respectively; a casing inlet in said inlet part communicating with said inlet chambers; a casing outlet in said outlet part communicating with said outlet chamber; a passageway extending between said parts and providing communication between said chambers; orifice means in said passageway for causing a pressure differential between said chambers; valve mechanism controlling communication between said outlet chamber and said outlet and including a movable valve member connected to said diaphragm and movable toward closed position on movement of said diaphragm inwardly of said outlet chamber; spring means engaged with said diaphragm for urging it outwardly of said outlet chamber; and means for adjusting said orifice means for adjusting the rate of flow through the regulator, said adjusting means including a metering valve member reciprocal in said orifice for adjusting the size thereof, a first dial mounted on said casing and having indicia associated therewith to indicate rates of application in quantities per unit area, means including a movable element operably connecting said first dial to said metering valve member for adjusting the latter to set the regulator for a predetermined rate of application at a given rate of travel, a second dial mounted on said casing and having indicia associated therewith to indicate rates of travel, and means including said element operably connecting said second dial to said metering valve member to further adjust the latter to set the regulator to correlate the setting of said first dial with different rates of travel.

9. The structure defined in claim 8 in which the metering valve member has a stem projecting to the exterior of the outlet casing part, one of the dials is mounted on said outlet casing part for rotation about an axis substantially parallel to the linear path of movement of said metering valve member, the movable element is an inclined arm having one end thereof hingedly connected to said one dial and bearing against the outer end of said metering valve stem, the other dial is mounted on the first for rotation about a spaced parallel axis, and including a helical element rotatable by said other dial and engageable with said arm.

References Cited in the file of this patent

UNITED STATES PATENTS

| | | |
|---|---|---|
| 2,117,182 | Lewis | May 10, 1938 |
| 2,301,041 | Hann | Nov. 3, 1942 |
| 2,307,949 | Phillips | Jan. 12, 1943 |
| 2,342,653 | Edwards | Feb. 29, 1944 |
| 2,608,209 | Bryant | Aug. 26, 1952 |
| 2,628,638 | Herod | Feb. 17, 1953 |
| 2,637,979 | Pool | May 12, 1953 |
| 2,720,891 | Glasgow | Oct. 18, 1955 |
| 2,807,144 | St. Clair | Sept. 24, 1957 |

FOREIGN PATENTS

| | | |
|---|---|---|
| 26,615 | Great Britain | Oct. 13, 1912 |